United States Patent
De Kock (10) Patent No.: US 10,670,105 B2
(45) Date of Patent: Jun. 2, 2020

(54) FREQUENCY SELECTIVE DAMPER VALVE, AND SHOCK ABSORBER COMPRISING SUCH DAMPER VALVE

(71) Applicant: KONI B.V., Oud-Beijerland (NL)

(72) Inventor: Paul De Kock, Numansdorp (NL)

(73) Assignee: KONI B.V., Oud-Beijerland (NL)

( * ) Notice: Subject to any disclaimer, the term of this patent is extended or adjusted under 35 U.S.C. 154(b) by 78 days.

(21) Appl. No.: 15/568,622

(22) PCT Filed: Apr. 25, 2016

(86) PCT No.: PCT/NL2016/050293
§ 371 (c)(1),
(2) Date: Oct. 23, 2017

(87) PCT Pub. No.: WO2016/171564
PCT Pub. Date: Oct. 27, 2016

(65) Prior Publication Data
US 2018/0156301 A1    Jun. 7, 2018

(30) Foreign Application Priority Data

Apr. 24, 2015    (NL) ...................................... 2014717

(51) Int. Cl.
*F16F 9/48* (2006.01)
*F16F 9/512* (2006.01)
(Continued)

(52) U.S. Cl.
CPC ............... *F16F 9/512* (2013.01); *F16F 9/19* (2013.01); *F16F 9/3488* (2013.01); *F16F 9/369* (2013.01);
(Continued)

(58) Field of Classification Search
CPC .................................................. B60G 13/08
(Continued)

(56) References Cited

U.S. PATENT DOCUMENTS 7,395,907 B2 *   7/2008   de Kock ................. F16F 9/512
                                                        137/614.2
9,638,280 B2 *   5/2017   Nowaczyk ............ F16F 9/5126
(Continued)

FOREIGN PATENT DOCUMENTS

DE   10 2011 102537 A1   2/2012
EP         1 442 227 A1   8/2004
(Continued)

OTHER PUBLICATIONS

International Search Report, dated Sep. 8, 2016, from corresponding PCT/NL2016/050293 application.

*Primary Examiner* — Christopher P Schwartz
(74) *Attorney, Agent, or Firm* — Hertzberg, Turk & Associates, LLC (57) ABSTRACT

A damper valve includes a controlled flow channel between inlet and outlet sides; a controlled valve in the controlled flow channel; a movable valve body acting on the controlled valve to change a closing force of the controlled valve; and a control chamber. The control chamber includes a control chamber inlet in fluid connection with the valve inlet side upstream of the controlled valve; a configuration providing a variable volume of the control chamber, a change in volume of the control chamber moving the movable valve body; and a first flexible wall allowing movement of the movable valve body. The first flexible wall provides an effective surface area against which the fluid pressure in the control chamber acts, the effective surface area decreasing upon movement of the movable valve body outward of the control chamber, the first flexible wall including a flex plate bearing against a curved surface.

34 Claims, 7 Drawing Sheets

(51) Int. Cl.
*F16F 9/19* (2006.01)
*F16F 9/348* (2006.01)
*F16F 9/36* (2006.01)
*F16K 15/14* (2006.01)
*F16K 17/04* (2006.01)

(52) U.S. Cl.
CPC ........ *F16K 15/145* (2013.01); *F16K 17/0413* (2013.01); *F16F 2226/04* (2013.01); *F16F 2226/048* (2013.01); *F16F 2228/066* (2013.01); *F16F 2228/08* (2013.01); *F16F 2230/30* (2013.01)

(58) Field of Classification Search
USPC ................ 188/282.5, 282.8, 313, 322.15
See application file for complete search history.

(56) References Cited

U.S. PATENT DOCUMENTS

| | | | | |
|---|---|---|---|---|
| 2005/0045440 A1* | 3/2005 | Kock | ................ | F16F 9/512 188/322.15 |
| 2011/0290603 A1* | 12/2011 | Yabe | ................ | F16F 9/348 188/282.1 |
| 2011/0297497 A1* | 12/2011 | Kim | ................ | F16F 9/3485 188/280 |
| 2012/0181126 A1* | 7/2012 | de Kock | ................ | F16F 9/3488 188/282.8 |
| 2013/0056317 A1* | 3/2013 | Kim | ................ | F16F 9/5126 188/275 |
| 2014/0000998 A1 | 1/2014 | Bismans et al. | | |
| 2014/0048366 A1* | 2/2014 | Lee | ................ | F16F 9/34 188/322.15 |
| 2014/0353097 A1* | 12/2014 | Kim | ................ | F16F 9/5126 188/313 |
| 2015/0053518 A1* | 2/2015 | Nowaczyk | ................ | F16F 9/5126 188/313 |
| 2015/0159727 A1* | 6/2015 | Park | ................ | F16F 9/3405 188/280 |
| 2015/0275999 A1* | 10/2015 | Mori | ................ | F16F 9/18 188/313 |
| 2018/0135720 A1* | 5/2018 | De Kock | ................ | F16F 9/512 |
| 2018/0306265 A1* | 10/2018 | De Kock | ................ | F16F 9/516 |
| 2018/0335105 A1* | 11/2018 | De Kock | ................ | F16F 9/5126 |
| 2018/0355945 A1* | 12/2018 | De Kock | ................ | F16F 9/5126 |

FOREIGN PATENT DOCUMENTS

| | | |
|---|---|---|
| JP | 5536600 B2 | 7/2014 |
| WO | 03/040586 A1 | 5/2003 |

* cited by examiner

FREQUENCY SELECTIVE DAMPER VALVE, AND SHOCK ABSORBER COMPRISING SUCH DAMPER VALVE

FIELD OF THE INVENTION

The invention relates to a damper valve, and shock absorber comprising such valve, The damper valve comprises a controlled flow channel arranged to provide a fluid connection between a valve inlet side and a valve outlet side of the damper valve; a controlled valve provided in the controlled flow channel such as, in operation, to allow influencing a controlled fluid flow in the controlled flow channel in a controlled flow direction from the valve inlet side to the valve outlet side; a movable valve body acting on the controlled valve, the movable valve body being movable with respect to a wall of the controlled flow channel so as to change a closing force of the controlled valve; and a control chamber. The control chamber comprises a control chamber inlet in fluid connection with the valve inlet side upstream of the controlled valve with reference to the controlled flow direction, the control chamber inlet comprising a flow restriction for a control fluid flow from the valve inlet side to the control chamber; and a configuration providing a variable volume of the control chamber, a change in volume of the control chamber acting so as to cause a movement of the movable valve body, an increase of a fluid pressure in the control chamber acting to increase the volume of the control chamber so as to move the movable valve body, thereby increasing a closing force of the controlled valve.

BACKGROUND OF THE INVENTION

Dampers, or shock absorbers, are well known and widely applied in, for instance, a variety of vehicles like cars, truck, buses and trains. The dampers are designed to provide a desired damping behavior between parts moving with respect to one another. Damping can be chosen to be stiff or soft by the specific design of the damper. More advanced dampers have been proposed, which provide a frequency selective damping behavior to the damper. A frequency selective valve can be added to the damper to provide a desired frequency selective damping behavior. Such frequency selective valve can be added to or incorporated into known damper configurations to provide additional frequency selectivity. On the other hand, such frequency selective dampers can also be employed in their own right in certain applications that require frequency selective damping of a fluid flow between two (pressure) chambers.

A pressure or control chamber can be employed in frequency selective valves and dampers having such type of valve incorporated. Upon a fluid flow in the valve which is to be damped so as to provide the damping behavior, a part of the fluid flow can be branched off to increase a pressure inside the pressure or control chamber. An increase in pressure inside the control chamber then acts to increase a closing force on a controlled valve provided in the flow channel for the fluid flow that is to be damped. The closing force of the controlled valve controls the momentary damping behavior.

One likes to have a predetermined increase of the closing force as a function of time, such as, for instance, a proportional relation between closing force and time. However, a desired relation between closing force and time is not easily obtained, if at all, in the presently known configurations of frequency selective valves. The increase in closing force generally shows a strong non-linear dependence on the pressure increase in the control chamber and therefore a strong non-linear dependence of time. One would like to have various parameters available to tune the closing force as a function of pressure inside the control chamber and thus as a function of time.

A pressure increases in time inside the control chamber to control the closing force of the controlled valve so as to provide frequency selective damping. However, for the known configurations the pressure inside the control chamber does not go back again to a neutral level for a next fluid flow to be damped, such as during a next stroke of a piston in its cylinder, which is to be damped. Having the control chamber pressure maintained at some level above neutral strongly deteriorates the performance of the frequency selective valve.

The presently known configurations further may show a strong dependence of individually manufactured valves on manufacturing tolerances. There is a need for a frequency selective valve configurations that is very robust to manufacturing tolerances so that any desired damping behavior will actually be achieved in any valve produced.

EP 1 442 227 A1 of applicant discloses a frequency dependent damper valve according to the field of the invention. Such damper valve proves to be very advantageous in, for instance, shock absorbers for cars to obtain a different damping behavior for movements associated with the car body and movements associated with the car wheels. The damper has a membrane as a flexible wall of the control chamber in contact with the movable valve body, which provides for an effective surface onto which the pressure in the control chamber acts to exert a closing force onto the controlled valve. However, the effective surface changes rapidly with movement of the movable valve member, which results in a non-linear dependency of the closing force of the controlled valve with the pressure inside the control chamber, an increase in closing force decreasing with increasing pressure in the control chamber. Further, it requires quite some force to deform the membrane, which will make dependence of the closing force of the controlled valve on the pressure inside the control chamber even more non-linear. The membrane becomes very stiff and provides a small effective surface at large deformation upon movement of the movable valve body outward of the control chamber. This provides for a non-optimal damping behavior, and makes the damping behavior of the valve very dependent on manufacturing tolerances. Generally, a pack of controlled valve plates is mounted on the movable valve member. The total height of the assembly will vary due to manufacturing tolerances, which has a very large effect on the performance of the damper valve. In some instances the pressure in the control chamber is not sufficient to provide enough closing force onto the controlled valve. It turns out that a large percentage of damper valve manufactured has to be discarded as their damping characteristics do not comply with the required specifications.

SUMMARY OF THE INVENTION

It is an objective of the invention to solve at least some of the shortcomings and/or disadvantages of known damper valves and shock absorbers and to provide a damper and shock absorber with a frequency selective damping characteristic.

The invention therefore provides for a damper valve comprising
a valve housing;

a controlled flow channel arranged to provide a fluid connection between a valve inlet side and a valve outlet side of the damper valve;

a controlled valve provided in the controlled flow channel to allow, in operation, influencing a controlled fluid flow in the controlled flow channel in a controlled flow direction from the valve inlet side to the valve outlet side;

a movable valve body acting on the controlled valve, the movable valve body being movable with respect to a wall of the controlled flow channel, the wall being associated with the valve housing, to change a closing force of the controlled valve; and a control chamber comprising
  a control chamber inlet in fluid connection with the valve inlet side upstream of the controlled valve with reference to the controlled flow direction, the control chamber inlet comprising a flow restriction for a control fluid flow from the valve inlet side to the control chamber;
  a configuration providing a variable volume of the control chamber, a change in volume of the control chamber acting to cause a movement of the movable valve body, an increase of a fluid pressure in the control chamber acting to increase the volume of the control chamber and to move the movable valve body, thereby increasing a closing force of the controlled valve; and
  a first flexible wall allowing a change in volume of the control chamber and allowing movement of the movable valve body upon a change in volume of the control chamber, and providing an effective surface area against which the fluid pressure in the control chamber acts, the effective surface area decreasing upon movement of the movable valve body in a direction outward of the control chamber, the first flexible wall comprising a flex plate bearing against a curved surface provided on the valve housing such that the effective surface area decreases upon movement of the flex plate and movable valve body in the direction outward of the control chamber.

Having a flex plate bearing against a curved surface provides for an improved proportional relation between time and pressure in the control chamber so as to provide at various damper pressures a same dynamic behaviour in the frequency domain. Only some deformation of the flex plate bearing against the curved surface occurs upon movement of the movable valve member, which only requires limited force by the pressure inside the control chamber. The closing force of the controlled valve shows a linear dependence on the pressure inside the control chamber, the closing force linearly increasing with an increase in pressure inside the control chamber. The dependency remains linear at every deflection of the flex plate. The effective surface shows a smaller decrease and the increase in stiffness is only small as compared to the configuration with a membrane disclosed in EP 1 442 227 A1 at a movement of the movable valve body outward of the control chamber. The damper valve can be very accurately tuned to the required specification, within narrow tolerances. Additionally, the closing force of the controlled valve and the damping characteristics prove not be very dependent on manufacturing tolerances. After In an embodiment the curved surface has a curvature radius.

In yet another embodiment that provides for a symmetric and efficient configuration, the movable valve body is provided centrally inside the valve housing, and the flex plate is ring shaped with a central opening receiving the movable valve body, the flex plate at an internal perimeter bearing against a seat provided on the movable valve body and at an external perimeter bearing against the curved surface.

In yet another embodiment the damper valve comprises a bias spring (150) acting on the movable valve body to provide an initial closing force of the controlled valve in a neutral state of the damper valve, in which neutral state the fluid pressure inside the control chamber is equal to a fluid pressure on the valve inlet side, optionally the bias spring comprising at least one plate, especially a stack of at least two plates. The bias spring allows setting an initial desired closing force of the controlled valve and may also act to keep the movable valve body in place.

In yet another symmetric and efficient embodiment the bias spring is ring shaped with a central opening receiving the movable valve body, the bias spring at an internal perimeter bearing against the movable valve body.

In yet another embodiment the bias spring at an external perimeter acts on the valve housing.

In yet another embodiment the damper valve comprises a valve housing comprising first and second valve housing parts, the controlled valve acting between the movable valve body and the first housing part, the bias spring acting on the second housing part, and the first and second housing parts being configured to allow, during manufacturing of the damper valve, moving the first and second housing parts with respect to one another to allow setting a predetermined bias force of the bias spring and a corresponding predetermined closing force of the controlled valve, being configured to allow fixing the first and second housing parts to one another while keeping the predetermined bias force of the bias spring, and having been fixed with respect to one another after having set the predetermined bias force of the bias spring. The both housing parts allow easy assembling of the damper valve and especially allow setting a desired initial closing force of the controlled valve. The initial closing force can be measured and set at a desired value during manufacturing, and is not dependent on any manufacturing tolerances of the various individual parts of the damper valve.

In yet another embodiment the first and second housing parts have been welded, optionally spot or laser welded, to one another. Welding, especially spot and laser welding, proves to be very suitable for joining the first and second housing parts, while they keep their relative position with respect to one another.

In yet another embodiment a sealing element, optionally a resilient sealing element, is provided against the flex plate at a control chamber side of the flex plate, such as to seal against the second housing part, optionally the sealing element comprising a rubber ring, optionally an O-ring. The sealing element inhibits any leakage that might occur around the flex plate.

In yet another embodiment a mounting spring acts on the flex plate to keep the flex plate bearing against the curved surface. In an embodiment the sealing element is provided in between the flex plate and the mounting spring.

In yet another embodiment the control chamber comprises a control chamber outlet in fluid connection with the valve outlet side and downstream of the controlled valve with reference to the controlled flow direction, the control chamber outlet comprising a flow restriction. The control chamber outlet with flow restriction provides a further parameter to control the time and therefore frequency dependency of the damper valve, especially the relation between time and pressure within the control chamber. The flow restriction as such can be the control chamber outlet.

In yet another embodiment the control chamber comprises a second flexible wall allowing a change in volume of the control chamber, which provides for an accumulative character of the control chamber as a further parameter to control time and frequency dependency.

In yet another embodiment the flow restriction of the control chamber outlet is provided in the second flexible wall.

In yet another embodiment the second flexible wall comprises at least one plate, optionally a stack of at least two plates.

In yet another embodiment a plate of the second flexible wall comprises at least one slit providing the flow restriction of the control chamber outlet.

In yet another embodiment a plate of the second flexible wall comprising the at least one slit bears against a seat.

In yet another embodiment the second flexible wall bears against the valve housing and the bias spring at its external perimeter acts on the second flexible wall, optionally one or more spacer elements, optionally spacer rings, being provided in between the second flexible wall and the bias spring such that the external perimeter of the bias spring bears against the one or more spacer elements. The bias spring in such configuration acts to both keep the movable valve body and the second flexible wall in place.

In yet another aspect the invention provides for a damper valve comprising
 a valve housing;
 a controlled flow channel arranged to provide a fluid connection between a valve inlet side and a valve outlet side of the damper valve;
 a controlled valve provided in the controlled flow channel such as, in operation, to allow influencing a controlled fluid flow in the controlled flow channel in a controlled flow direction from the valve inlet side to the valve outlet side;
 a movable valve body acting on the controlled valve, the movable valve body being movable with respect to a wall of the controlled flow channel so as to change a closing force of the controlled valve; and
 a control chamber comprising
  a control chamber inlet in fluid connection with the valve inlet side upstream of the controlled valve with reference to the controlled flow direction, the control chamber inlet comprising a flow restriction; and
  a configuration providing a variable volume of the control chamber, a change in volume of the control chamber acting so as to cause a movement of the movable valve body, an increase of a fluid pressure in the control chamber acting to increase the volume of the control chamber so as to move the movable valve body outward of the control chamber thereby increasing a closing force of the controlled valve, and the damper valve further comprising
 a bias spring acting on the movable valve body to provide an initial closing force of the controlled valve in a neutral state of the damper valve, in which neutral state the fluid pressure inside the control chamber is equal to a fluid pressure on the valve inlet side. The bias spring allows setting an initial desired closing force of the controlled valve and may also act to keep the movable valve body in place,
 wherein the valve housing comprises first and second housing parts, the controlled valve acting between the movable valve body and the first housing part, the bias spring acting on the second valve housing part, and the first and second housing parts being configured to allow, during manufacturing of the damper valve, moving the first and second housing parts with respect to one another to allow setting a predetermined bias force of the bias spring and a corresponding predetermined closing force of the controlled valve, being configured to allow fixing the first and second housing parts to one another while keeping the predetermined bias force of the bias spring, and having been fixed with respect to one another after having set the predetermined bias force of the bias spring.

EP 1 442 227 A1 of applicant discloses a frequency selective damper valve having a bias spring and a valve housing comprising first and second housing parts. The bias spring acts on the second housing part, and the controlled valve on the first housing part. The actual bias force is determined by the geometry of the damper valve and is very dependent on manufacturing tolerances. The first and second housing parts are fixed to one another by a bottom part of the first housing part having been fold over the second housing part. The folded-over part of the first housing part presses against the second housing part. Such construction is not very reliable in providing a well-defined bias force, and therefore also provides a large variation in the bias force by the bias spring in the damper valves manufactured. Having a second housing part that can be moved and accurately positioned with respect to the first housing part during manufacturing to obtain a desired bias force, and subsequently be fixed to the first housing part solves such disadvantages.

In an embodiment the first and second housing parts have been welded, optionally spot or laser welded, to one another. Welding, especially spot and laser welding, proves to be very suitable for joining the first and second housing parts, while they keep their relative position with respect to one another.

In an embodiment the bias spring comprises at least one plate, especially a stack of at least two plates.

In another symmetric and efficient embodiment the bias spring is ring shaped with a central opening receiving the movable valve body, the bias spring at an internal perimeter bearing against the movable valve body.

In yet another embodiment the bias spring at an external perimeter acts on the valve housing.

In yet another embodiment the control chamber comprises a second flexible wall allowing a change in volume of the control chamber, which provides for an accumulative character of the control chamber as a further parameter to control time and frequency dependency.

In yet another embodiment a flow restriction of a control chamber outlet is provided in the second flexible wall.

In yet another embodiment the second flexible wall comprises at least one plate, optionally a stack of at least two plates.

In yet another embodiment a plate of the second flexible wall comprises at least one slit providing the flow restriction of the control chamber outlet.

In yet another embodiment a plate of the second flexible wall comprising the at least one slit bears against a seat.

In yet another embodiment the second flexible wall bears against the second housing part and the bias spring at its external perimeter acts on the second flexible wall, optionally one or more spacer elements, optionally spacer rings, being provided in between the second flexible wall and the bias spring such that the external perimeter of the bias spring bears against the one or more spacer elements.

In yet another embodiment the controlled valve comprises at least one plate, optionally a stack of at least two plates.

In another aspect the invention provides for a shock absorber comprising
- a cylinder;
- a piston movable in the cylinder and sealing against a wall of the cylinder such as to divide the cylinder in first and second cylinder chambers on either side of the piston; and
- a damper valve as referred to above, the valve inlet side in fluid connection with one of the first and second cylinder chambers and the valve outlet side in fluid connection with the other one of the first and second cylinder chambers.

In yet another aspect the invention provides for a method of manufacturing a damper valve or a shock absorber referred to above and having the first and second housing parts, wherein the damper valve is assembled, after which the first and second housing parts are moved with respect to one another to set a predetermined bias force of the bias spring and a corresponding predetermined closing force of the controlled valve, and the first and second housing parts are fixed with respect to one another after having set the predetermined bias force of the bias spring. The both housing parts allow easy assembling of the damper valve and especially allow setting a desired initial closing force of the controlled valve. The initial closing force can be measured and set at a desired value during manufacturing, and is not dependent on any manufacturing tolerances of the various individual parts of the damper valve.

In an embodiment the first and second housing parts are welded, especially spot or laser welded, to one another.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
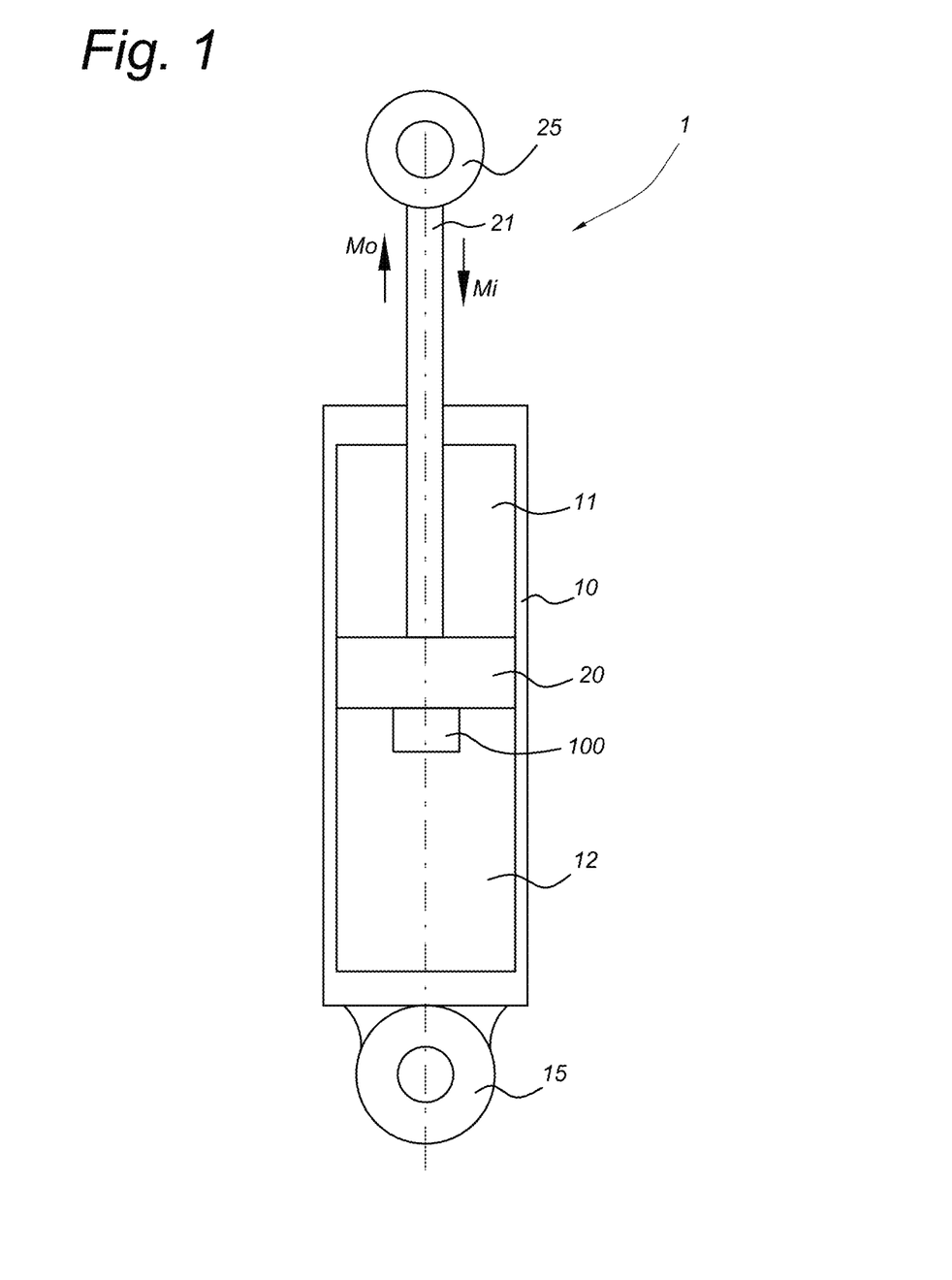
FIG. 1 shows an embodiment of a damper (shock absorber) comprising a damper valve according to the invention.

FIG. 1 schematically shows a shock absorber or damper 1 according to the invention. The damper comprises a cylinder 10 and a piston 20 that can move inwards and outwards of the cylinder. The direction of movement of the inward and outward strokes of the piston are indicated by the arrows labeled Mi and Mo, respectively. The piston seals against the inner cylindrical wall of the cylinder and divides the cylinder in a first or upper cylinder chamber 11 and a second or lower cylinder chamber 12. A piston rod 21 attached to the piston 20 is in a sealing fashion guided through a top wall of the cylinder 10. The damper can be attached by its cylinder and piston attachment arrangements 15, 25 to, for instance, parts of a car to damp relative movements. Damping is achieved by influencing a fluid flow in between first and second cylinder chambers by an arrangement in the piston 20 and an additional damper valve 100 mounted on the piston.

Figure 2:
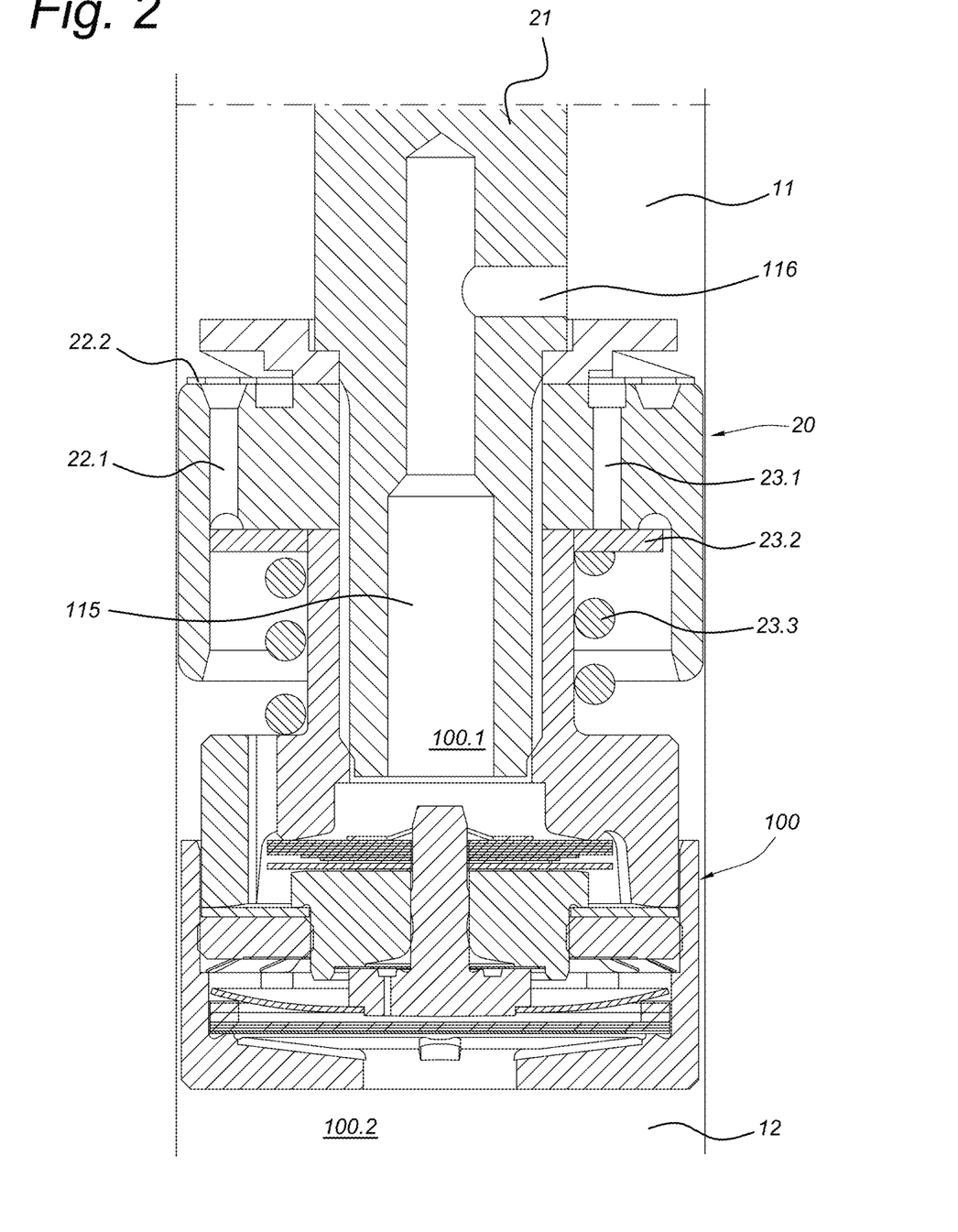
FIG. 2 shows an embodiment of the piston of the damper of FIG. 1, the damper valve being mounted on the piston.

The piston is shown in more detail in FIG. 2. Upon inward movement Mi of the piston 20 fluid from the lower cylinder chamber 12 enters into a first main channel 22.1 in the piston. The first channel 22.1 together with one-way first main valve 22.2 at the end of the first main channel provides for a fluid connection from second or lower cylinder chamber 12 to the first or upper cylinder chamber 11. The first main channel 22.1 and/or the first main valve 22.2 present a flow restriction to fluid flow and act to damp the fluid flow from second to first cylinder chamber and therefore to damp inward piston movement. Damping also occurs on outward piston movement Mo at an outward stroke of the piston 20 in a direction out of the cylinder 10. Fluid passes through second main channel 23.1 on the outward stroke. One-way second main valve 23.2 is provided at the outlet of the channel 23.1 to only allow fluid flow in one direction. A spring 23.3 provides a closing force on the second main valve 23.2. Again fluid flow through the channel is damped since the second main channel 23.1 and/or the second main valve 23.2 present a flow restriction to fluid flow. The main channels and main valve can be configured in various ways to present a desired stiff or soft damping behavior. In the embodiment shown, the first main channel 22.1 together with first main valve 22.2 will generally present a different kind of damping behavior than the second main channel 23.1 together with second main valve 23.2 with its spring 23.3.

To also present a frequency selective damping behavior on an outward stroke the piston 20 is additionally provided with a frequency selective damper valve 100. The additional valve 100 only acts on outward movement Mo of the piston in the embodiment shown. The frequency selective valve of the invention may also be provided in other configurations in which a frequency selective damping is required for a fluid flow in between two chambers.

Figure 3A:
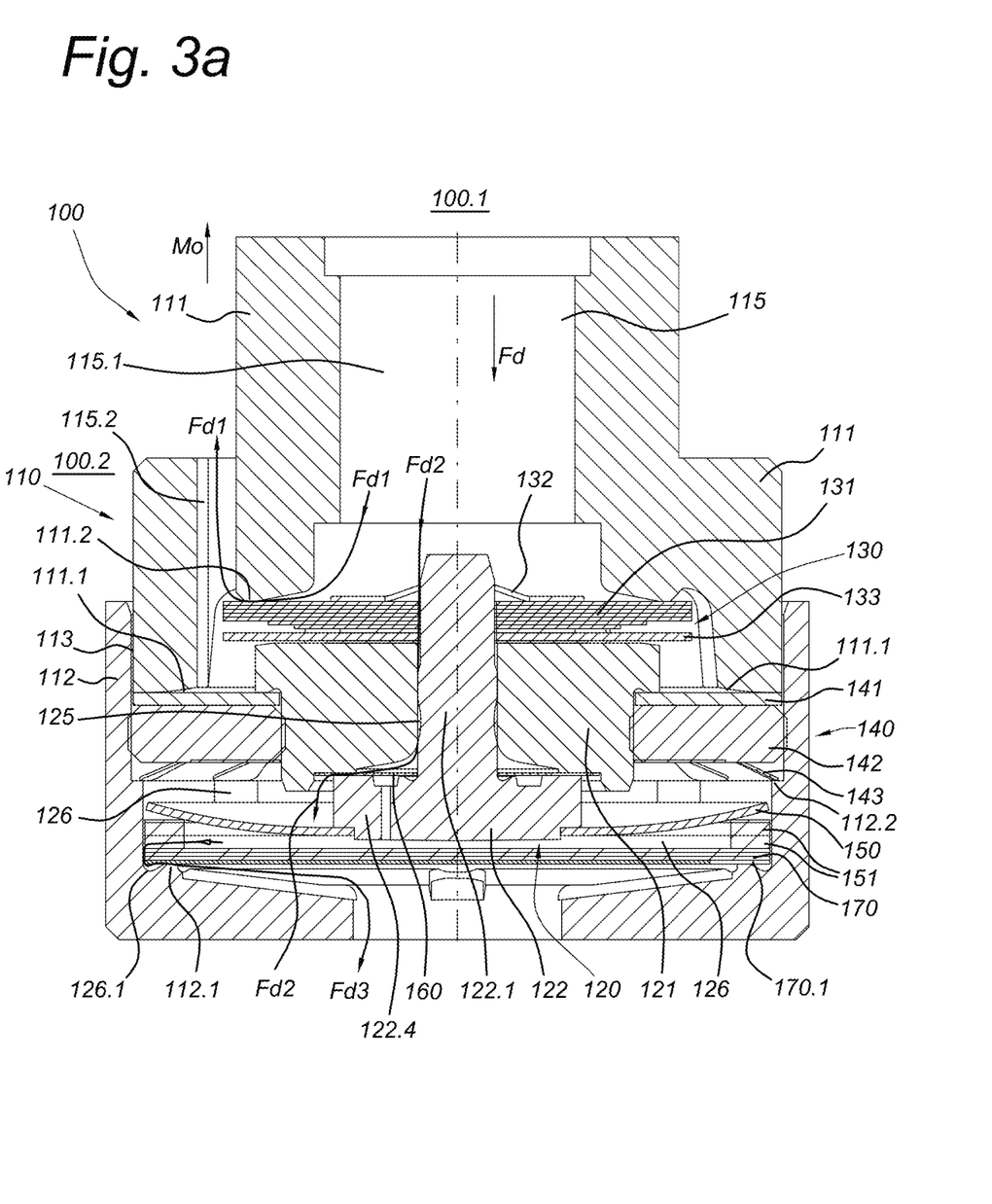
FIGS. 3a and 3b show an embodiment of a damper valve according to the invention in a neutral configuration and a fully closed configuration, respectively.

FIG. 3a shows the frequency selective valve 100 in more detail. The frequency selective valve 100 comprises a first fixed part 111 mounted on the piston 20, and a second fixed part 112 mounted on the first fixed part. The first and second fixed parts 111, 112 constitute two parts of the housing of the frequency selective valve, and will also be referred to as first (fixed) housing part 111 and second (fixed) housing part 112. The frequency selective valve 100 further comprises a movable valve body 120 and a controlled valve 130 mounted on the movable valve body 120. The movable valve body 120 is movable with respect to a wall of the controlled flow channel 115, which wall is associated with the housing of the damper valve. The controlled valve 130 acts to influence a controlled fluid flow Fd in controlled flow channel 115 through valve housing 110. Fluid may enter into the controlled flow channel 115 at its opening 116 on the first cylinder chamber 11 side of the piston. The channel 115 passes through the piston rod 21. A controlled fluid flow direction is also indicated by reference symbol Fd.

The fluid flow Fd is damped by action of the controlled valve 130. Controlled valve 130 is a one-way valve and can only pass a controlled fluid flow part Fd1 in the direction indicated in FIG. 3*a*. The frequency selective valve 100 therefore acts in one direction only, which is on outward movement direction Mo of the piston out of the cylinder. Such outward movement direction Mo of the piston induces a (damped) fluid flow Fd in an opposite direction through the piston and the frequency selective valve 100. The controlled fluid flow Fd is from the upper cylinder chamber 11 to the lower cylinder chamber 12, from a valve inlet side 100.1 to valve outlet side 100.2 of the damper valve 100. Damping of the controlled fluid flow Fd causes a damping of the movement of the piston 20 inside the cylinder 10. Damping by damper valve 100 occurs together with a damping action by second main valve 23.2 and second main channel 23.1. As will be described below, damper valve 100 will close after some time span, after which damping action is only affected by second main valve 23.2 and second main channel 23.1.

A flow part Fd1 of the damped fluid flow Fd passes controlled valve 130 in the controlled flow channel 115 through the frequency selective valve 100. Influencing of the fluid flow Fd1 by controlled valve 130 provides the damping behavior of the frequency selective valve 100. Controlled flow channel 115 comprises an upstream flow channel part 115.1 upstream of controlled valve 130 with respect to controlled fluid flow Fd and a downstream flow channel part 115.2 downstream of controlled valve 130.

Another flow part Fd2 of the fluid flow Fd at outward movement of the piston passes through control channel 125 in the movable valve body 120 to a control or pressure chamber 126. The control chamber 126 is delimited by movable valve body 120, second fixed housing part 112, upper/first (flexible) wall 140 and lower/second wall 170. The lower/second wall is also configured as a flexible wall 170 of the control chamber 126 in the embodiment shown.

Figure 4A:
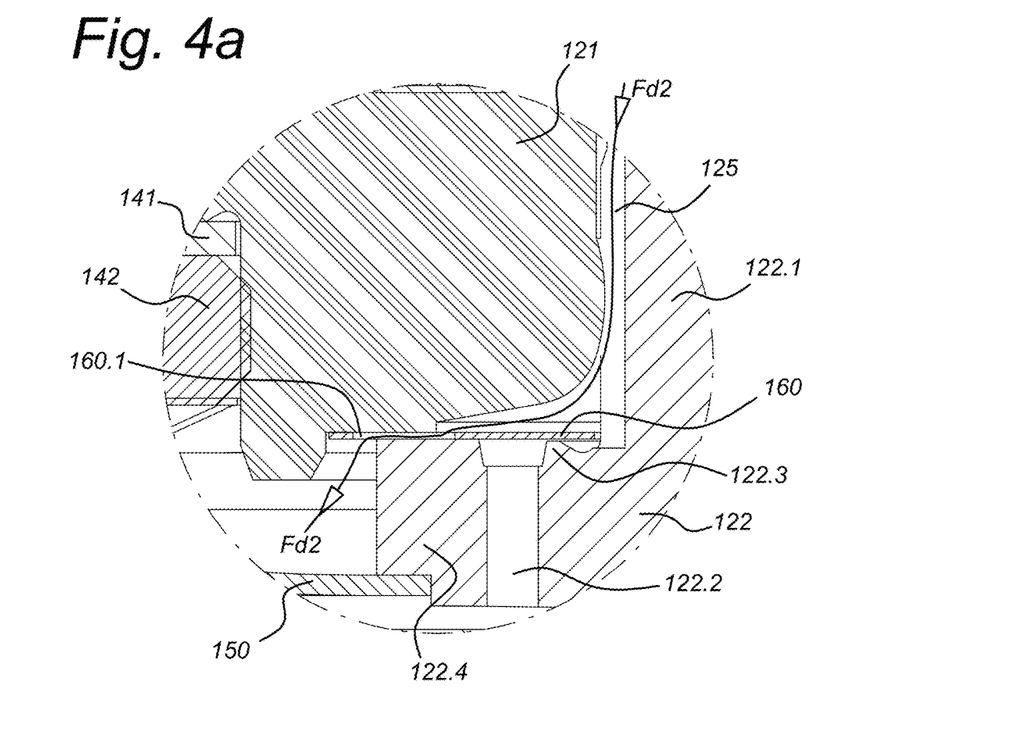
FIG. 4a shows a control valve of the damper valve of FIGS. 3a and 3b in a configuration acting as a flow restriction.
Figure 4B:
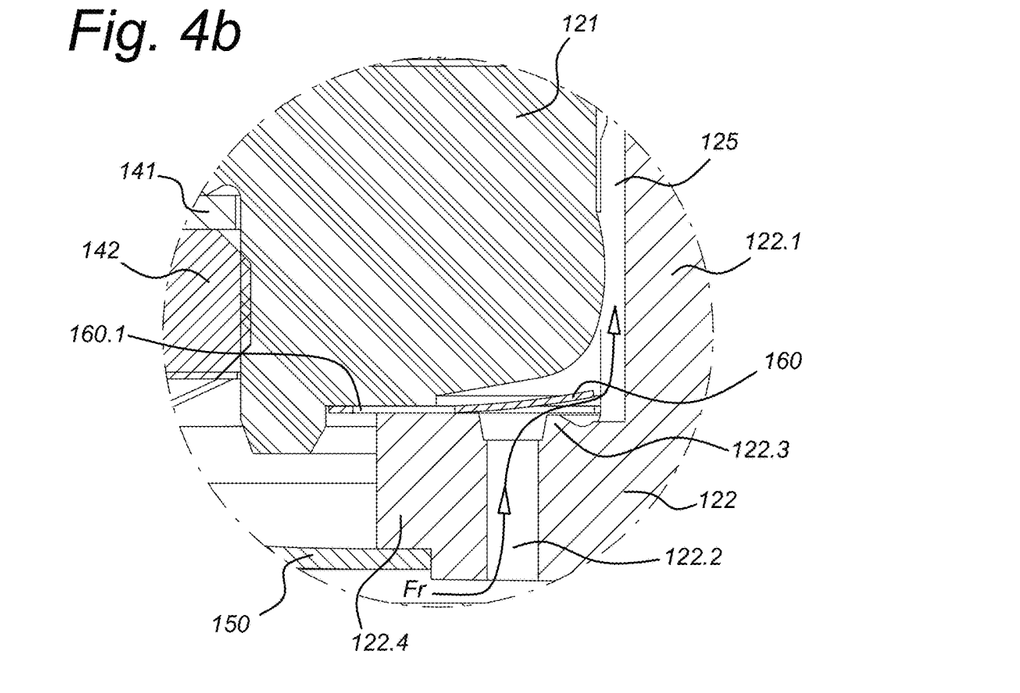
FIG. 4b shows the control valve of FIG. 4b in a configuration acting as a pressure relief valve.

FIG. 4*a* shows a detail of control channel 125 in the movable valve body 120. The control flow part Fd2 of the damped fluid flow Fd passes through the control channel 125, which is provided between first and second movable valve body parts 121, 122. The first valve body part 121 has a ring-like configuration with a central opening. The second valve body part 122 has an upside-down T-shaped configuration with rotational symmetry, of which the stem 122.1 projects through the central opening in the first valve body part 121. A T-shaped configuration is meant to be understood as having a substantial T-shape in cross-section. One or more vertical or spiral grooves in the stem of the second valve body part 122 provide for an upper part of the control channel 125 and for centering of the first valve body part 121 on the second valve body part 122.

Below the bottom end of the grooves of the control channel 125 a control valve 160 is provided. The control valve 160 is centered around the stem 122.1 of the second valve body part 122 and extends in a horizontal plane. The control valve 160 comprises a plate that is clamped and held at its external perimeter in between the first and second valve body parts 121, 122, especially between the first valve body part 121 and the base 122.4 of the second valve body part 122. The control valve plate 160 comprises radial grooves or slits 160.1 at its external perimeter to provide for a flow restriction for the control flow Fd2 through the control channel 125 into control or pressure chamber 126.

Figure 3B:
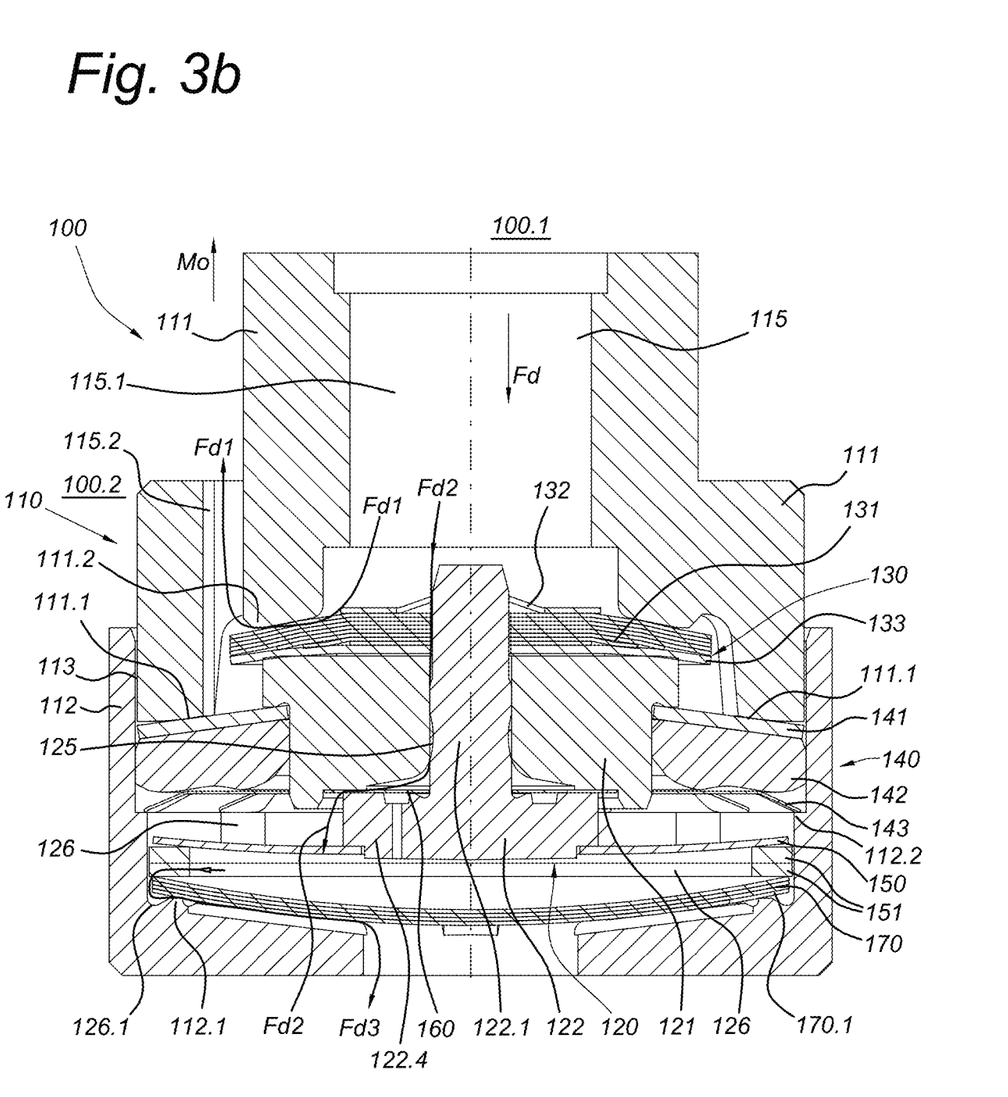

The inward control flow Fd2 into the control chamber 126 is determined by the pressure difference across the control channel 125 and the flow restriction 160.1 in the control valve 160. The inward control flow Fd2 acts to increase the pressure in control chamber 126. An outward control flow Fd3 out of the control chamber 126 occurs through flow restrictions 170.1 provided in the external perimeter of the flexible bottom wall 170 of the control chamber. Flexible bottom wall 170 is configured as a number of stacked plates closing against a seat 112.1 provided in the second fixed housing part 112. The bottom plate of the plate stack of the bottom flexible wall 170 is provided with grooves or slits 170.1 that provide for a constant opening across the seat 112.1 to yield the flow restriction for outward control flow Fd3 from circumferential groove 126.1. Fluid may freely flow into circumferential groove 126.1 as part of the control chamber 126 since the diameter of the plates of the flexible wall 170 is smaller than an internal diameter of the control chamber 126. The grooves or slits 170.1 act as both a control chamber outlet and a flow restriction of the control chamber outlet, The balance between the inward control flow Fd2 and the outward control flow Fd3 provides for a pressure increase or decrease inside the control chamber. The flow restrictions for inward and outward control flows Fd2, Fd3 are configured such that generally the pressure inside the control chamber will increase upon outward movement Mo of the piston. A pressure increase in the control chamber acts on the movable valve body 120 to move it in an upward direction so as to increase a volume of the control chamber 126, as is shown in FIG. 3*b*. The pressure increase in the control chamber 126 also causes flexible bottom wall 170 to move outwards for a further increase of the volume of the control chamber 126. An increase of the volume of the control chamber causes the pressure inside the control chamber 126 to rise less quickly as compared to a configuration in which the volume of the control chamber would not increase or would increase less. This may be referred to as the fluid accumulation ability of the control chamber. The volume increase as a result of flexibility of the bottom flexible wall 170 is dependent on the stiffness of the plate pack of the bottom/second wall 170. The flexibility is, inter alia, governed by the number, thickness, surface area and material of the plates in the plate pack. Various parameters are thus available to tune pressure increase inside the control chamber 126 upon outward movement of the piston and corresponding controlled fluid flow Fd.

Controlled valve 130 is mounted on the movable valve body 120, especially around the top end of the upward pointing stem 122.1 of the second movable valve body part 122 and is supported on the first movable valve body part 121. The groove(s) in the stem of second movable body part 122, which are part of the control channel 125 extend upwards past the controlled valve 130 and have an open end in fluid connection with the controlled flow channel 115 upstream of the controlled valve 130 and thus in fluid connection with the valve inlet side 100.1. The controlled valve 130 comprises a stack of valve plates 130 that is clamped by clamp part 132 onto the movable valve body 120. At the bottom side of the stack of plates 131 a stiff plate 133 is provided to limit flexure of the controlled valve 130. The plates 130 have an increasing or equal diameter in a direction from a bottom plate 131 upwards to allow flexure of the stack of plates 131 on top of the stiff plate 133. FIG. 3*a* shows the controlled valve 130 in its neutral position and FIG. 3*b* shows the controlled valve in its configuration of maximum flexure. In the neutral position the pressures inside the control chamber 126, at the valve inlet side 100.1 and at the valve outlet side 100.2 are equal to one another.

Figure 5A:
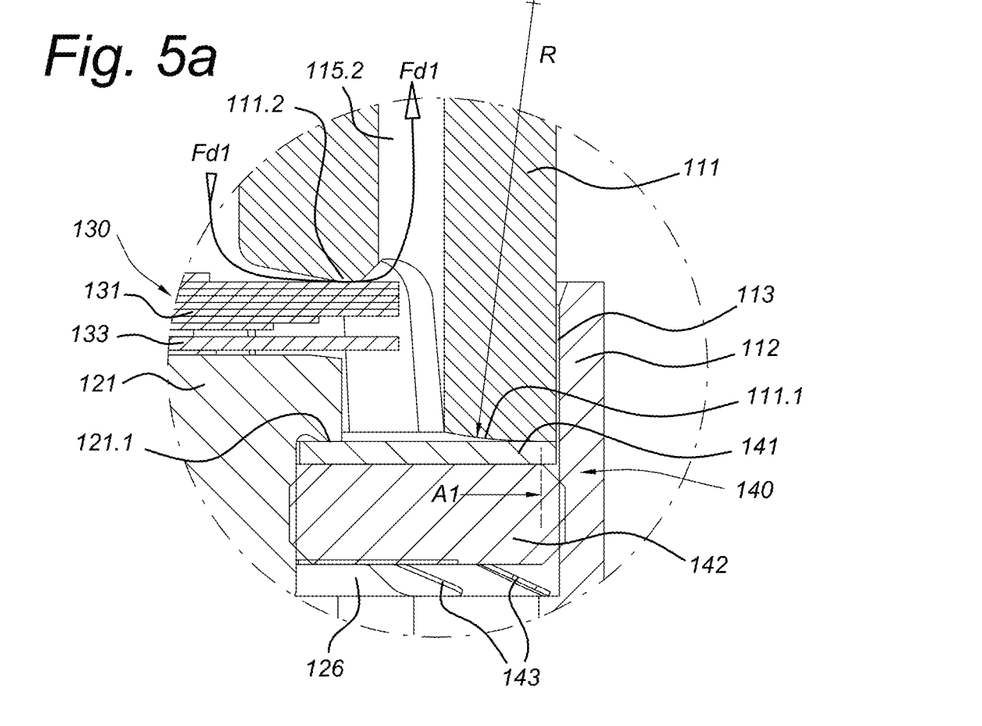
FIGS. 5a and 5b show a detail of an embodiment of a first (upper) flexible wall of the frequency selective valve of FIGS. 3a and 3b and corresponding to the configurations of FIGS. 3a and 3b, respectively.
Figure 5B:
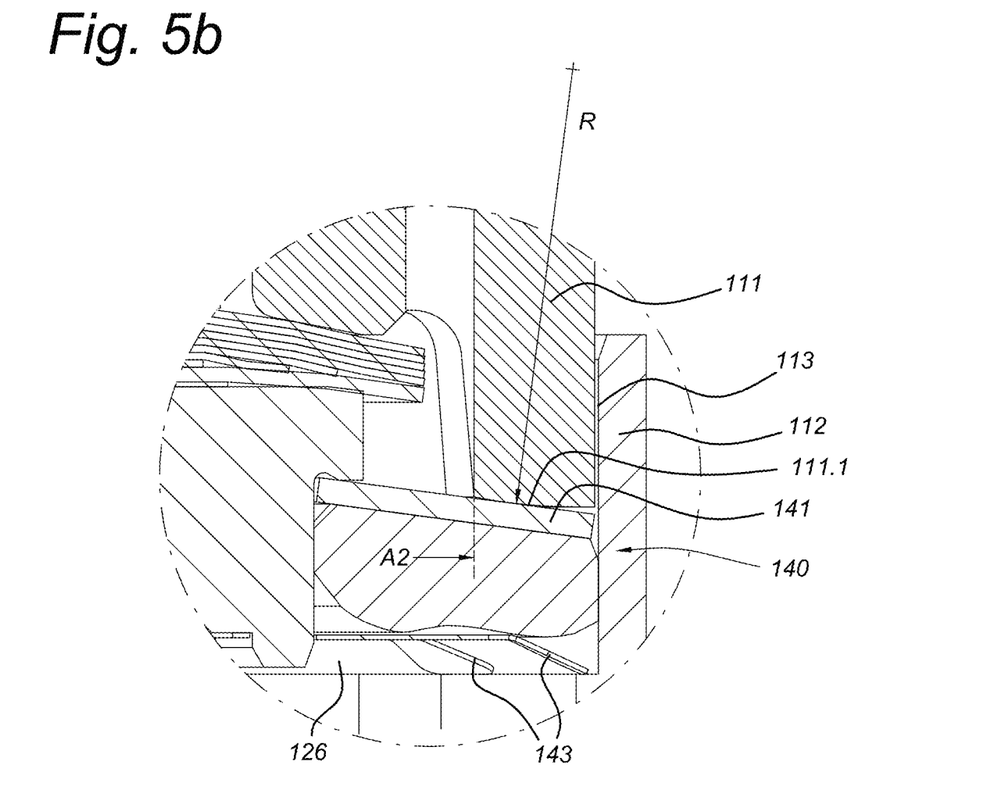

At its top side the control chamber 126 has a top/first flexible wall 140 to allow movement of the movable valve body 120 up and down for volume increase and decrease of the control chamber 126. FIGS. 5*a* and 5*b* show the top flexible wall 140 in its neutral position and its position of maximum flexure, respectively. In the embodiment shown, the top flexible wall 140 comprises a ring-shaped flex plate 141 laying against a seat 121.1 on the first movable valve body 121 and against a curved surface 111.1 of the first fixed housing part 111. A resilient member 142, for instance, a rubber O-ring, is arranged beneath the flex plate 141 to seal the control chamber 126 at its top end, especially against leakage through a slit between the first and second fixed housing parts 111, 112 above the outer circumference of flex plate 141. A (soft) spring member 143 is provided below the resilient member 142 to keep the flex plate 141 pressed against curved surface 111.1 and seat 121.1 of the movable valve body 120 in the neutral position of the frequency selective valve 100 as shown in FIG. 3*a*. The spring member 143 is secured between resilient member 142 and a rim 112.2 provided on the internal surface of the second fixed housing member 112.

Flex plate 141 has a chosen stiffness as determined by its material, internal and external diameters and its thickness. The effective stiffness of the flex plate is further determined by the curvature radius R of curved surface 111.1, the effective stiffness increasing with increasing flexure since the area or line of contact between flex plate 141 and curved surface 111.1 moves towards the center of the frequency selective valve 100 as indicated by the dashed lines in FIGS. 5*a* and 5*b*. The shifting of the area or line of contact to the center of the frequency selective valve 100 also causes the effective surface area of the flex plate 141 on which the pressure inside the control chamber 126 acts, to decrease. Such surface area of the flex plate 141 is in between its internal diameter and the diameter indicated by the dashed lines in FIGS. 5*a* and 5*b*. The surface area A1 in the neutral situation is larger than the surface area A2 in the case of increased flexure of the flex plate 141. Both the increased stiffness and reduced surface area compensate for an increased pressure inside the control chamber 126. An increase in closing force of controlled valve 130 with increasing pressure is balanced by a decrease in effective surface area and an increased stiffness of the flex plate 141 to obtain a linear relation between closing force and pressure within the control chamber.

A bias spring 150 is arranged such against movable valve member 120 that an upward biasing force is provided on movable valve member 120. The upwards biasing force provides for a closing force on the controlled valve 130 against its valve seat 111.2 in a neutral position of the frequency selective valve as shown in FIG. 3*a*. The biasing force is small in the embodiment shown and therefore a small pressure difference across controlled valve is sufficient to provide a controlled flow Fd1 across controlled valve 130 through downstream part 115.2 of the controlled flow channel 115 to the valve outlet side 100.2 in the neutral position of the movable valve body 120 of FIG. 3*a*. The bias spring is configured as a ring-shaped plate 150, which at its internal perimeter contacts a rim on the second part 122 of the movable valve member 120. At its external perimeter the bias spring plate 150 rests on spacer rings 151 arranged in between the bias plate 150 and the bottom flexible plate pack 170. In such configuration the bias spring 150 keeps both the movable valve body 120 and the bottom flexible plate pack in place. Bias spring 150 is arranged within the control chamber 126 and fluid may freely flow around and past the bias spring. The bias spring does not act as a flow restriction element within the control chamber. FIG. 3*a* show a neutral configuration of the frequency selective valve 100. FIG. 3*b* shows a configuration of maximum movement of the movable valve body 120 and maximum flexure of the controlled valve 130. The bias spring 150 shows only some minor flexure in FIG. 3*b* and will therefore only exert a minimal bias force on the movable valve member 120. In the FIG. 3*b* configuration an upward force exerted on the movable valve member 120 due the pressure inside the control chamber acting on an effective surface of the movable valve member 120 and the top flexible wall 140 is larger than a downward force exerted on the movable valve member due to the pressure at the valve inlet side 100.1 acting on an effective surface of the controlled valve 130. Further, in the FIG. 3*b* configuration the pressure in the control chamber 126 is larger than the pressures in the second cylinder chamber at the valve outlet side 100.2. The effective surfaces on both sides of the flexible bottom wall 170 on which the respective pressure act are about equal, The pressure at the valve outlet side 100.2 in the second cylinder chamber 12 is smaller than the pressure at the valve inlet side 100.1 in the first cylinder chamber 11, and therefore does hardly contribute to a downward force on the top flexible wall 140.

At the start of an outward movement Mo of the piston in an outward direction with respect to the cylinder a controlled or damper flow Fd will occur from the first or top cylinder chamber through a channel in the piston rod towards the frequency selective valve 100 mounted on the piston. The frequency selective valve 100 is in its neutral position as shown in FIG. 3*a*. The biasing force exerted by the bias spring plate 150 on the movable valve body closes controlled valve 130 with a small closing force on its valve seat 111.2. Controlled flow Fd1 thus easily passes controlled valve 130 and damping of controlled flow Fd and therefore damping of the piston movement is only small. Upon pressure increase in the first cylinder chamber 11, which induces controlled flow Fd, a control flow Fd2 will also occur through control channel 125 in the movable valve body 120 towards control chamber 126. The inward control flow Fd2 causes a pressure increase in the control chamber, which will induce an outward control flow Fd3 past the outer perimeter of the bottom flexible wall 170 out of the control chamber 126. The pressure increase inside the control chamber 126 and amount of movement of the movable valve body 120 is a balance between inward control flow Fd2, outward control flow Fd3 and volume increase of the control chamber due to upward movement of the movable valve body 120 and outward flexure of top and bottom flexible walls 140, 170, together with respective effective surface areas. The pressure increase and amount of movement of the movable valve body is governed by various parameters, such as the flow restrictions for the inward and outward control flows Fd2, Fd3, stiffness of top and bottom flexible walls 140, 170, curvature radius of curved surface area 111.1, etcetera as has been described earlier.

Upward movement of the movable valve body 120 causes a larger closing force acting on the controlled valve 130. This causes an increased damping of the controlled flow Fd in between the first and second cylinder chambers 11, 12 and therefore an increased damping of the piston movement. Preferably the closing force acting on the controlled valve is proportional with time, which can be achieved by careful tuning of the various parameters in the design of the frequency selective valve 100 and during assembly of the valve 100.

During assembly the various components of the frequency selective valve 100 can be mounted in any feasible order up to the step of attaching first and second fixed housing parts 111 and 112 to one another. Until such attachment of both housing parts 111, 112 to one another, both parts can move relative to one another in a longitudinal direction, which is the vertical direction in the figures. The first and second housing parts 111, 112 are then positioned with respect to one another until a desired biasing force by the bias spring 150 is obtained. The biasing force can be measured during assembly. Having obtained such position with a desired biasing force, both housing parts can be attached to one another by point welding at various spots 113 around the first and second housing parts 111, 112 of the frequency selective valve. The frequency selective valve with the configuration as disclosed is very insensitive, if at all, to any manufacturing tolerances. Such tolerance easily occur during manufacturing, but are compensated at the final assembly step of positioning the first and second fixed housing parts with respect to one another and (spot or laser) welding them together at a desired biasing force. Any other suitable means of attaching the first and second housing parts together may be employed as well. It is noted that only one spot welding location 113 is shown in FIGS. 3a and 3b. In an actual embodiment the welding spots will be provided all around the frequency selective valve 100.

The initial closing force of the controlled valve 130 is determined by the biasing force of bias spring 150, which is tuned during assembly. At the end of an outward stroke of the piston 20 within its cylinder 10, the piston will reverse to an inward stroke. During an inward stroke the pressure inside the first or upper cylinder chamber 11 is lower than the pressure inside the second or lower cylinder chamber 12. The pressure inside the control chamber will then decrease since a fluid flow Fr will occur in a direction opposite to control fluid flow Fd1 through its corresponding flow restriction and control channel 125 in movable valve body 120 towards the first or upper cylinder chamber. To allow the pressure inside the control chamber to become equal to the pressure within the first cylinder chamber and to allow the movable valve body to return to its neutral position as shown in FIG. 3a during an inward stroke, the plate 160 also acts as a pressure relief valve. The pressure of the fluid inside the control chamber 126 acts on the bottom side of plate valve 160 via channel 122.2 in the second movable valve body part 122. Valve plate 160 is embodied as a one-way valve closing on valve seat 122.3. It opens towards valve inlet side 100.1 and the first cylinder chamber 11, so pressure and fluid is released in a fluid relief flow Fr towards the first channel part 115.1 of controlled channel 115 and further towards the first cylinder chamber. At the end of the inward stroke of the piston the frequency selective valve 100 and its movable valve body 120 have returned to their neutral configuration to allow for a new cycle of frequency controlled damping at the next outward stroke of the piston. Opening of the pressure relief valve 160 bypasses the flow restriction 160.1 provided in the same pressure relief valve.

Figure 4C:
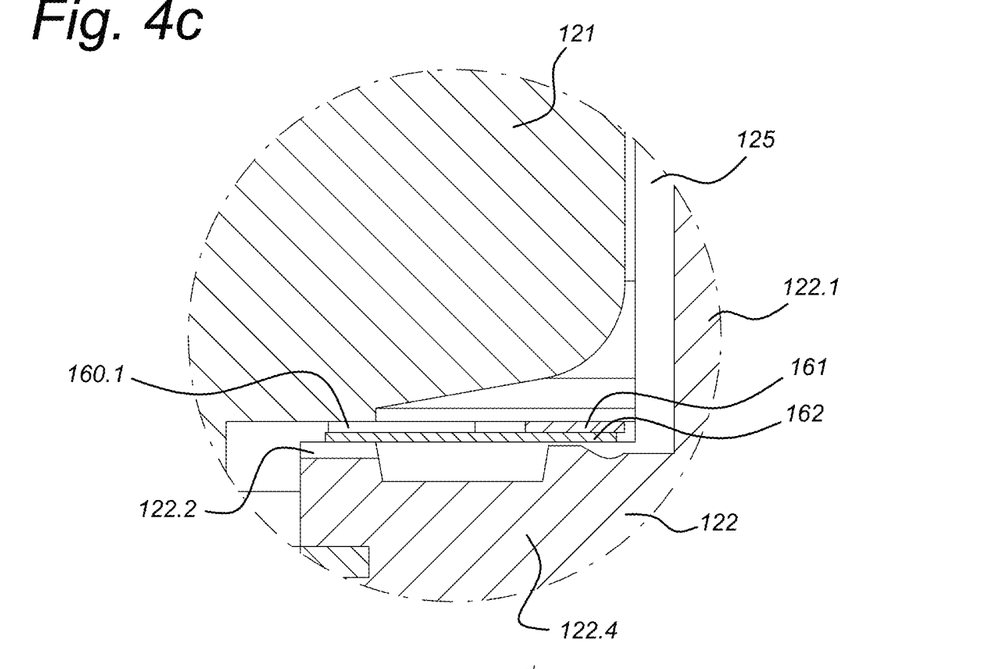
FIG. 4c shows an alternative embodiment of a control valve of a damper valve according to the invention.

FIG. 4c shows an alternative embodiment of the pressure relief valve and flow restriction in the control channel 125 in the movable valve body 120. The control valve 160 of FIG. 4c comprises a top or flow restriction plate 161 and a bottom plate 162. The flow restriction 160.1 for control flow Fd1 is provided in the flow restriction plate 161 in the same fashion as described with reference to the FIG. 4a embodiment. The bottom or pressure relief valve plate 162 of control valve 160 rests at its internal perimeter on the valve seat 122.3 provided on the second valve body part 122. The pressure relief valve plate 162 together with channel openings 122.2 in the second valve body part 122 below the external perimeter of the pressure relief valve plate 162 of the control valve 160 allow for a pressure relief fluid flow Fr out of the control chamber 126 past the control valve 160 to the controlled flow channel 115 and the upper cylinder chamber.

A pressure in the pressure or control chamber 126 will have increased after an outward movement Mo of the piston, so the pressure in the control chamber 160 will be relieved at inward piston movement when the pressure in the control chamber 126 is larger than a pressure in the upper cylinder chamber. The control valve 160 through the pressure relief plate 162 on the valve seat 121.3 acts as a pressure relief valve bypassing the flow restriction 160.1 in the flow restriction plate 161 to relief the pressure within control chamber 126 at inward piston movement.

The invention claimed is:

1. A damper valve (100) comprising:
   a valve housing (111, 112);
   a controlled flow channel (115) arranged to provide a fluid connection between a valve inlet side (100.1) and a valve outlet side (100.2) of the damper valve;
   a controlled valve (130) provided in the controlled flow channel to allow, in operation, influencing a controlled fluid flow (Fd) in the controlled flow channel in a controlled flow direction (Fd) from the valve inlet side to the valve outlet side;
   a movable valve body (120) acting on the controlled valve, the movable valve body being movable with respect to a wall of the controlled flow channel, the wall being associated with the valve housing (111, 112), to change a closing force of the controlled valve; and
   a control chamber (126) providing a variable volume, wherein a change in volume of the control chamber acts to cause a movement of the movable valve body (120), and an increase of a fluid pressure in the control chamber acts to increase the volume of the control chamber and to move the movable valve body, thereby increasing a closing force of the controlled valve (130), the control chamber (126) comprising
   a control chamber inlet (125) in fluid connection with the valve inlet side (100.1) upstream of the controlled valve (130) with reference to the controlled flow direction (Fd), the control chamber inlet comprising a flow restriction (160.1) for a control fluid flow (Fd2) from the valve inlet side to the control chamber;
   a first flexible wall (140) allowing a change in volume of the control chamber and allowing movement of the movable valve body (120) upon a change in volume of the control chamber, and providing an effective surface area against which the fluid pressure in the control chamber (126) acts, the effective surface area decreasing upon movement of the movable valve body (120) in a direction outward of the control chamber, the first flexible wall comprising a flex plate (141) bearing against a curved surface (111.1) provided on the valve housing (111, 112) such that the effective surface area decreases upon movement of the flex plate and movable valve body in the direction outward of the control chamber.

2. The damper valve according to claim 1, wherein the control chamber (126) comprises a control chamber outlet (112.1) in fluid connection with the valve outlet side (100.2)

and downstream of the controlled valve (130) with reference to the controlled flow direction (Fd), the control chamber outlet comprising a flow restriction (170.1).

3. The shock absorber according to claim 2, wherein the control chamber (126) comprises a second flexible wall (170) allowing a change in volume of the control chamber.

4. The shock absorber according to claim 3, wherein the flow restriction (170.1) of the control chamber outlet is provided in the second flexible wall (170).

5. The shock absorber according to claim 4, wherein the second flexible wall (170) comprises at least one plate, optionally a stack of at least two plates.

6. The shock absorber according to claim 5, wherein a plate of the second flexible wall comprises at least one slit (170.1) providing the flow restriction of the control chamber outlet.

7. The shock absorber according to claim 6, wherein a plate of the second flexible wall (170) comprising the at least one slit bears against a seat (112.1).

8. The damper valve according to claim 7, wherein the valve housing comprises first and second valve housing parts (111, 112), the controlled valve (130) acting between the movable valve body (120) and the first housing part (111), the bias spring (150) acting on the second housing part (112), and the first and second housing parts being configured to allow, during manufacturing of the damper valve, moving the first and second housing parts with respect to one another to allow setting a predetermined bias force of the bias spring (150) and a corresponding predetermined closing force of the controlled valve (130), being configured to allow fixing the first and second housing parts to one another while keeping the predetermined bias force of the bias spring (150), and having been fixed with respect to one another after having set the predetermined bias force of the bias spring (150), and wherein the second flexible wall (170) bears against the valve housing (112) and the bias spring (150) at its external perimeter acts on the second flexible wall, optionally one or more spacer elements (151), optionally spacer rings, being provided in between the second flexible wall and the bias spring (150) such that the external perimeter of the bias spring bears against the one or more spacer elements (151).

9. The damper valve according to claim 1, wherein the damper valve comprises a bias spring (150) acting on the movable valve body (120) to provide an initial closing force of the controlled valve (130) in a neutral state of the damper valve, in which neutral state the fluid pressure inside the control chamber (126) is equal to a fluid pressure on the valve inlet side (100.1), optionally the bias spring (150) comprising at least one plate, especially a stack of at least two plates.

10. The damper valve according to claim 9, wherein the bias spring (150) is ring shaped with a central opening receiving the movable valve body (120), the bias spring at an internal perimeter bearing against the movable valve body.

11. The damper according to claim 10, wherein the bias spring (150) at an external perimeter acts on the valve housing (111, 112).

12. The damper valve according to claim 11, wherein the valve housing comprises first and second valve housing parts (111, 112), the controlled valve (130) acting between the movable valve body (120) and the first housing part (111), the bias spring (150) acting on the second housing part (112), and the first and second housing parts being configured to allow, during manufacturing of the damper valve, moving the first and second housing parts with respect to one another to allow setting a predetermined bias force of the bias spring (150) and a corresponding predetermined closing force of the controlled valve (130), being configured to allow fixing the first and second housing parts to one another while keeping the predetermined bias force of the bias spring (150), and having been fixed with respect to one another after having set the predetermined bias force of the bias spring (150).

13. The damper valve according to claim 12, wherein the first and second housing parts (111, 112) have been welded, optionally spot or laser welded, to one another.

14. The damper valve according to claim 1, wherein a sealing element (142), optionally a resilient sealing element, is provided against the flex plate (141) at a control chamber (126) side of the flex plate, such as to seal against the second housing part (112), optionally the sealing element comprising a rubber ring, optionally an O ring.

15. The damper valve according to claim 14, wherein a mounting spring (143) acts on the flex plate (141) to keep the flex plate bearing against the curved surface (111.1).

16. The damper valve according to claim 15, wherein the sealing element is provided in between the flex plate and the mounting spring.

17. The damper valve according to claim 1, wherein the curved surface (111.1) has a curvature radius (R).

18. The damper valve according to claim 1, wherein the movable valve body (120) is provided centrally inside the valve housing (111, 112), and the flex plate (141) is ring shaped with a central opening receiving the movable valve body, the flex plate at an internal perimeter bearing against a seat (121.1) provided on the movable valve body and at an external perimeter bearing against the curved surface (111.1).

19. The damper valve according to claim 1, wherein the controlled valve (130) comprises at least on plate (131), optionally a stack of at least two plates.

20. A shock absorber (1) comprising
a cylinder (10);
a piston (20) movable in the cylinder and sealing against a wall of the cylinder such as to divide the cylinder in first and second cylinder chambers (11, 12) on either side of the piston; and
a damper valve (100) according to claim 1, the valve inlet side (100.1) in fluid connection with one of the first and second cylinder chambers and the valve outlet side (100.2) in fluid connection with the other one of the first and second cylinder chambers.

21. A damper valve (100) comprising:
a valve housing (111, 112);
a controlled flow channel (115) arranged to provide a fluid connection between a valve inlet side (100.1) and a valve outlet side (100.2) of the damper valve;
a controlled valve (130) provided in the controlled flow channel such as, in operation, to allow influencing a controlled fluid flow (Fd) in the controlled flow channel in a controlled flow direction (Fd) from the valve inlet side to the valve outlet side;
a movable valve body (120) acting on the controlled valve, the movable valve body being movable with respect to a wall of the controlled flow channel so as to change a closing force of the controlled valve;
a control chamber (126) providing a variable volume, wherein a change in volume of the control chamber acts so as to cause a movement of the movable valve body (120), and an increase of a fluid pressure in the control chamber acts to increase the volume of the control chamber so as to move the movable valve body outward of the control chamber thereby increasing a closing force of the controlled valve (130), the control chamber (126) comprising a control chamber inlet (125) in fluid connection with the valve inlet side (100.1) upstream of the controlled valve (130) with reference to the controlled flow direction (Fd), the control chamber inlet comprising a flow restriction (160.1); and a bias spring (150) acting on the movable valve body (120) to provide an initial closing force of the controlled valve (130) in a neutral state of the damper valve, in which neutral state the fluid pressure inside the control chamber (126) is equal to a fluid pressure on the valve inlet side (100.1), wherein the valve housing comprises first and second housing parts (111, 112), the controlled valve (130) acting between the movable valve body (120) and the first housing part (111), the bias spring (150) acting on the second valve housing part (112), and the first and second housing parts being configured to allow, during manufacturing of the damper valve, moving the first and second housing parts with respect to one another to allow setting a predetermined bias force of the bias spring (150) and a corresponding predetermined closing force of the controlled valve (130), and wherein the first and second housing parts are welded to one another.

22. The damper valve according to claim 21, wherein the control chamber further comprises a first flexible wall (140) allowing a change in volume of the control chamber and allowing movement of the movable valve body (120) upon a change in volume of the control chamber, and providing an effective surface area against which the fluid pressure in the control chamber (126) acts, the effective surface area decreasing upon movement of the movable valve body (120) in a direction outward of the control chamber, the first flexible wall comprising a flex plate (141) bearing against a curved surface of the first housing part (111), a mounting spring (143) acts on the flex plate (141) and a rim of the internal surface of the second housing part (112) to keep the flex plate bearing against the curved surface (111.1), and a sealing element (142), optionally a resilient sealing element, is provided against the flex plate (141) at a control chamber (126) side of the flex plate, such as to seal against the second housing part (112), optionally the sealing element comprising a rubber ring, optionally an O ring, the sealing element being provided in between the flex plate and the mounting spring.

23. The damper valve according to claim 22, wherein the first and second housing parts (111, 112) have been spot or laser welded to one another.

24. The damper valve according claim 23, wherein the bias spring (150) comprises at least one plate, especially a stack of at least two plates.

25. The damper valve according claim 24, wherein the bias spring (150) is ring shaped with a central opening receiving the movable valve body (120), the bias spring at an internal perimeter bearing against the movable valve body.

26. The damper valve according to claim 25, wherein the bias spring (150) at an external perimeter acts on the valve housing (111, 112).

27. The damper valve according to claim 26, wherein the control chamber (126) comprises a second flexible wall (170) allowing a change in volume of the control chamber.

28. The damper valve according to claim 27, wherein a flow restriction (170.1) of a control chamber outlet is provided in the second flexible wall (170).

29. The damper valve according to claim 28, wherein the second flexible wall (170) comprises at least one plate, optionally a stack of at least two plates.

30. The damper valve according to claim 29, wherein a plate of the second flexible wall comprises at least one slit (170.1) providing the flow restriction of the control chamber outlet.

31. The damper valve according to claim 30, wherein a plate of the second flexible wall (170) comprising the at least one slit bears against a seat (112.1).

32. The damper valve according to claim 31,
wherein the bias spring (150) comprises at least one plate, especially a stack of at least two plates, and wherein the second flexible wall (170) bears against the second housing part (112) and the bias spring (150) at its external perimeter acts on the second flexible wall, optionally one or more spacer elements (151), optionally spacer rings, being provided in between the second flexible wall and the bias spring (150) such that the external perimeter of the bias spring bears against the one or more spacer elements (151).

33. A method of manufacturing a damper valve or a shock absorber comprising
a valve housing (111, 112);
a controlled flow channel (115) arranged to provide a fluid connection between a valve inlet side (100.1) and a valve outlet side (100.2) of the damper valve;
a controlled valve (130) provided in the controlled flow channel to allow, in operation, influencing a controlled fluid flow (Fd) in the controlled flow channel in a controlled flow direction (Fd) from the valve inlet side to the valve outlet side;
a movable valve body (120) acting on the controlled valve, the movable valve body being movable with respect to a wall of the controlled flow channel, the wall being associated with the valve housing (111, 112), to change a closing force of the controlled valve; and
a control chamber (126) providing a variable volume, wherein a change in volume of the control chamber acts to cause a movement of the movable valve body (120), and an increase of a fluid pressure in the control chamber acts to increase the volume of the control chamber and to move the movable valve body, thereby increasing a closing force of the controlled valve (130), the control chamber (126) comprising i) a control chamber inlet (125) in fluid connection with the valve inlet side (100.1) upstream of the controlled valve (130) with reference to the controlled flow direction (Fd), the control chamber inlet comprising a flow restriction (160.1) for a control fluid flow (Fd2) from the valve inlet side to the control chamber, and ii) a first flexible wall (140) allowing a change in volume of the control chamber and allowing movement of the movable valve body (120) upon a change in volume of the control chamber, and providing an effective surface area against which the fluid pressure in the control chamber (126) acts, the effective surface area decreasing upon movement of the movable valve body (120) in a direction outward of the control chamber, the first flexible wall comprising a flex plate (141) bearing against a curved surface (111.1) provided on the valve housing (111, 112) such that the effective surface area decreases upon movement of the flex plate and movable valve body in the direction outward of the control chamber, the valve housing (111, 112) comprising first and second housing parts (111, 112), the method comprising:

assembling the damper valve including moving the first and second housing parts (111, 112) with respect to one another to set a predetermined bias force of a bias spring (150) and a corresponding predetermined closing force of the controlled valve (130); and after the first and second housing parts (111, 112) are moved with respect to one another to set the predetermined bias force of the bias spring (150) and the corresponding predetermined closing force of the controlled valve (130), welding the first and second housing parts (111, 112) to one another.

34. The method according to claim 33, wherein the first and second housing parts (111, 112) are spot or laser welded to one another.

* * * * *